No. 727,230. Patented May 5, 1903.

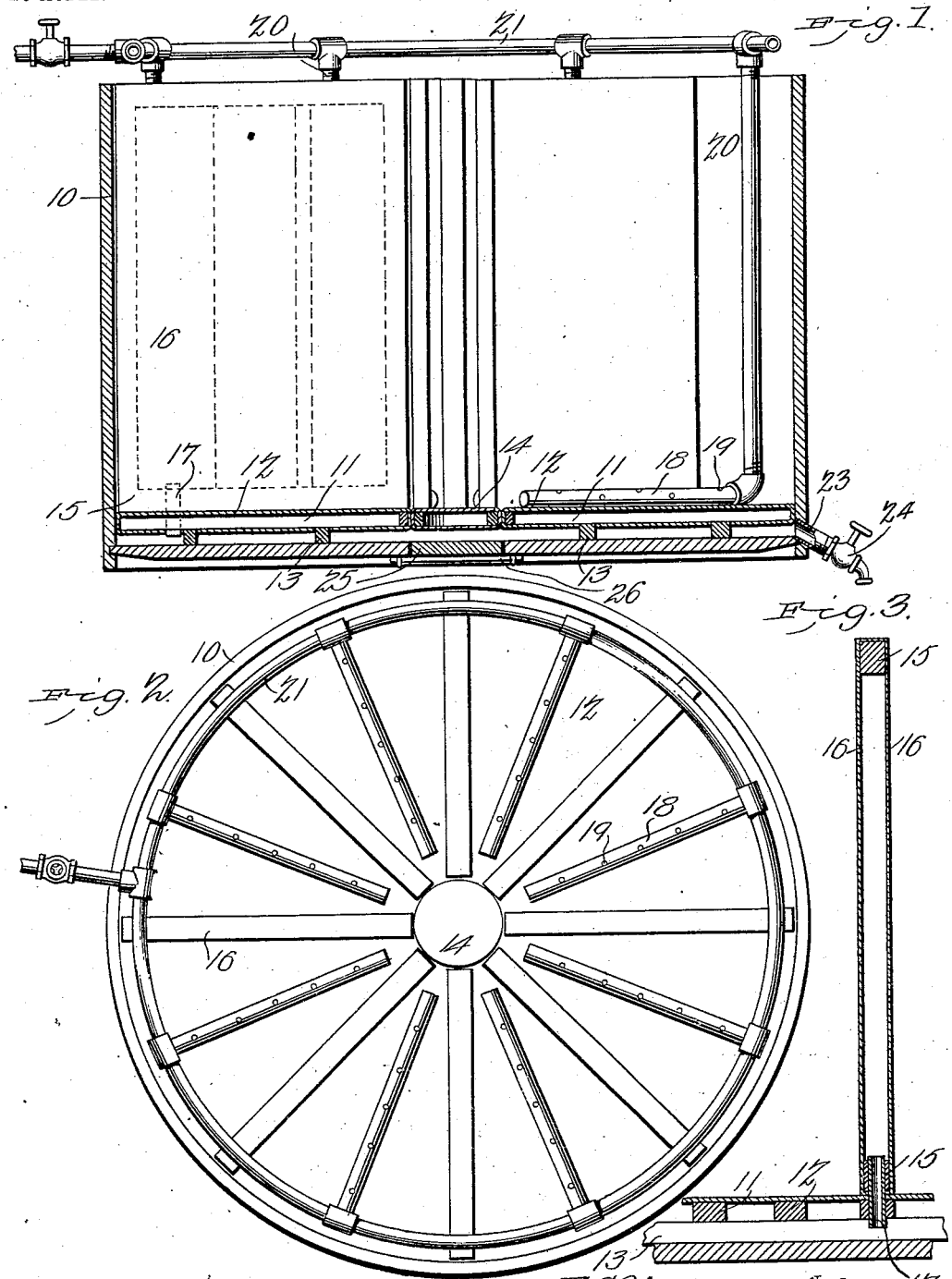

UNITED STATES PATENT OFFICE.

FRANK G. UNDERWOOD, OF PLUMA, SOUTH DAKOTA.

LEACHING-TANK FILTER.

SPECIFICATION forming part of Letters Patent No. 727,230, dated May 5, 1903.

Application filed February 20, 1903. Serial No. 144,271. (No model.)

*To all whom it may concern:*

Be it known that I, FRANK G. UNDERWOOD, a citizen of the United States, residing at Pluma, in the county of Lawrence and State of South Dakota, have invented a new and useful Leach-Tank Filter, of which the following is a specification.

This invention relates to filtering apparatus, more particularly to filtering attachments to the tanks employed in the treatment of ores by the cyanid process, and has for its object to simplify the construction of devices of this character, to increase the capacity, and to improve the product; and the invention consists in certain novel features of the construction, as hereinafter shown and described, and specified in the claims.

In the drawings illustrative of the invention, in which corresponding parts are denoted by like designating characters, Figure 1 is a vertical sectional side elevation, and Fig. 2 is a plan view, of a filtering-tank with the improvements attached. Fig. 3 is an enlarged sectional detail illustrating the construction of the vertical filter members.

The improved device may be attached to any size or form of tank, and for the purpose of illustration an ordinary tank is indicated at 10 with the discharge-pipe at 23, provided with a controlling-valve 24.

Within the tank 10 and spaced from the bottom is a filtering-diaphragm formed in the usual manner of cross-slats 11 and covered with suitable fabric (indicated at 12) and supported above the bottom of the tank, as by cleats 13, whereby a space between the diaphragm and the bottom of the tank is formed, as shown in Fig. 1.

The diaphragm 11 12 13 will be provided with a central aperture provided with a closure 14, and the tank-bottom will be provided with a corresponding aperture having a closure 25, through which the leached ore may be removed.

Within the tank above the diaphragm are arranged a plurality of vertical filter members spaced apart and each independently communicating with the space beneath the diaphragm and preferably arranged radially between the central discharge-aperture of the diaphragm and the walls of the tank and with the feed-pipes for the dissolving solution arranged between the vertical filter members. By this means a very large filtering-surface is obtained within a comparatively small area and the dissolving solution uniformly distributed, and thereby rendered more thoroughly effective in its action.

The vertical filter members are formed of oblong open frames 15, covered at their opposite sides with suitable filtering fabric, (indicated at 16,) thereby forming relatively narrow spaces between the walls.

The frames 15 will be suitably supported upon the diaphragm and will preferably be arranged radially, with their outer edges engaging the walls of the tank and their inner edges even with the edges of the discharge-aperture, as shown in Fig. 2.

Any desired number of the vertical filter members may be employed and spaced any desired distance apart, and I do not, therefore, wish to be limited in any manner to any specific number or sizes of these portions of the improved device.

Each of the vertical frames 15 will be provided with a short pipe-section 17, passing downward through the diaphragm, so that the solution filtering through the fabric 16 will flow into the space beneath the diaphragm, as will be obvious.

Between each pair of the vertical filter members will be arranged a pipe-section 18, perforated at suitable intervals, as at 19, and each pipe provided with a vertical branch 20, leading above the tank and preferably connected to one common supply-pipe 21 and affording means for the introduction of the dissolving solution, such as cyanid. By this simple means the solution is uniformly distributed throughout the whole mass of the material in the tank, thereby insuring a much more efficient treatment and action. The solution being introduced at the bottom of the mass rises through it, and thus reaches every part and thoroughly saturates and impregnates it, producing not only a more uniform and rapid action, but a more economical action, as the solution being so uniformly distributed is not wasted by acting with greater force upon some parts than others. By thus distributing the solution no necessity exists for agitating the material. Hence the apparatus is much cheaper to operate, as no expensive and cumbersome agitating machinery is required, besides producing a very material saving in the wear and tear of machinery. Another great advantage gained by this arrangement is that by introducing the solution at the bottom of the mass the finer particles are carried to the surface, thereby very materially increasing the capacity by preventing the finer material from settling upon and clogging the filtering fabric.

The device can thus be advantageously employed in treating all kinds of ore products no matter how fine and is therefore a very efficient and valuable device for the purposes described.

Any suitable material may be employed as coverings for the frames 15, and I do not, therefore, desire to be limited in any manner to any specific material for this purpose.

Having thus described my invention, what I claim is—

1. In an apparatus of the class described, a tank having an interior filter-diaphragm spaced from the bottom thereof, in combination with filter members vertically disposed within said tank and communicating with the space beneath said filter-diaphragm, and feed-pipes for the dissolving solution alternating with said vertical filter members, substantially as described.

2. In an apparatus of the class described, a tank having an interior filter-diaphragm spaced from the bottom thereof, in combination with a plurality of vertical filter members radially disposed within said tank and communicating with the space beneath said diaphragm, and feed-pipes for the dissolving solution within the spaces between said vertical filter members, substantially as described.

3. In an apparatus of the class described, a tank having an interior filter-diaphragm spaced from the bottom thereof, in combination with filter members vertically disposed and spaced apart within said tank and communicating with the space beneath said diaphragm, and feed-pipes for the dissolving solution alternating with said vertical filter members and terminating in perforated horizontal sections relatively near said diaphragm, substantially as described.

4. In an apparatus of the class described, a tank having an interior filter-diaphragm spaced from the bottom thereof and having a central discharge-aperture provided with a movable closure, in combination with vertical filter members radially disposed and spaced apart between said discharge-aperture and the walls of the tank and communicating with the space beneath the diaphragm, substantially as described.

5. In an apparatus of the class described, a tank having an interior filter-diaphragm spaced from the bottom thereof and having a central discharge-aperture provided with a movable closure, in combination with vertical filter members radially disposed and spaced apart between said discharge-aperture and the walls of the tank and communicating with the space beneath the diaphragm, and feed-pipes for the dissolving solution alternating with said vertical filter members, substantially as described.

6. In an apparatus of the class described, a tank having an interior filter-diaphragm spaced from the bottom thereof, in combination with filter members vertically disposed within said tank and consisting of frames formed with spaced side walls of porous material and with tubular connections leading through said diaphragm, substantially as described.

7. In an apparatus of the class described, a tank having an interior filter-diaphragm spaced from the bottom thereof, in combination with filter members vertically disposed within said tank and consisting of oblong frames covered with filtering fabric forming spaced side walls, and tubular discharge connections between the interiors of said frames and the spaces beneath said diaphragm, substantially as described.

8. In an apparatus of the class described, a tank having an interior filter-diaphragm spaced from the bottom thereof, in combination with filter members consisting of oblong frames covered with filtering fabric and forming spaced side walls and radially disposed within said tank, tubular discharge members connecting the interiors of said vertical filter members with the space beneath said diaphragm, and feed-pipes for the dissolving solution disposed between said vertical filter members, substantially as described.

9. In an apparatus of the class described, a tank having filter members vertically disposed therein in combination with feed-pipes for the dissolving solution alternating with said filter members, substantially as described.

10. In an apparatus of the class described, a tank having filter members vertically disposed therein in combination with feed-pipes for the dissolving solution alternating with said filter members relatively near the bottom of the tank, substantially as described.

11. In an apparatus of the class described, a tank having filter members vertically disposed therein in combination with feed-pipes for the dissolving solution alternating with said filter members, and means for supplying the dissolving solution under pressure, substantially as described.

12. In an apparatus of the class described, a tank, a plurality of vertical filter members radially disposed within said tank, and feed-pipes for the dissolving solution within the spaces between said vertical filter members, substantially as described.

13. In an apparatus of the class described, a tank, vertically-disposed filter members spaced apart within said tank, and feed-pipes for the dissolving solution alternating with said filter members and terminating in perforated horizontal sections relatively near the bottom of the tank, substantially as described.

14. In an apparatus of the class described, a tank having a central discharge-aperture provided with a movable closure, in combination with vertical filter members radially disposed within the tank and spaced apart between said discharge-aperture and the walls of the tank, substantially as described.

15. In an apparatus of the class described, a tank having a central discharge-aperture provided with a movable closure, in combination with vertical filter members radially disposed within the tank and spaced apart between said discharge-aperture and the walls of the tank, and feed-pipes for the dissolving solution alternating with said filter members, substantially as described.

16. In an apparatus of the class described, a tank having a central discharge-aperture provided with a movable closure, an interior filter-diaphragm spaced from the bottom of the tank and having a central discharge-aperture registering with the tank-discharge aperture and provided with a movable closure, in combination with vertical filter members radially disposed and spaced apart between said discharge-apertures and the walls of the tank and communicating with the space beneath the diaphragm, substantially as described.

In testimony that I claim the foregoing as my own I have hereto affixed my signature in the presence of two witnesses.

FRANK G. UNDERWOOD.

Witnesses:
JOHN GILROY,
R. N. STONPANT.